United States Patent [19]

Sprague

[11] Patent Number: 4,515,566

[45] Date of Patent: May 7, 1985

[54] FLIP CARD APPARATUS FOR FORMING UNITS OF SPEECH

[76] Inventor: Robert S. Sprague, 448 La Prenda Rd., Los Altos, Calif. 94022

[21] Appl. No.: 546,030

[22] Filed: Oct. 27, 1983

[51] Int. Cl.³ .................... G09B 1/12; G09B 17/00
[52] U.S. Cl. .................................................. 434/172
[58] Field of Search ............... 434/167, 172, 174, 178

[56] References Cited

U.S. PATENT DOCUMENTS

| | | | |
|---|---|---|---|
| 660,255 | 10/1900 | Kingma | 434/178 X |
| 1,280,930 | 10/1918 | Wolfe | 434/167 |
| 2,523,828 | 9/1950 | Howe | 434/112 X |
| 3,307,274 | 3/1967 | Glaser | 434/113 X |
| 3,744,154 | 7/1973 | Pott | 434/167 |

FOREIGN PATENT DOCUMENTS

| | | | |
|---|---|---|---|
| 490943 | 2/1930 | Fed. Rep. of Germany | 434/172 |
| 578881 | 6/1933 | Fed. Rep. of Germany | 434/172 |
| 613115 | 11/1960 | Italy | 434/172 |

*Primary Examiner*—William H. Grieb

[57] ABSTRACT

A flip card apparatus is disclosed having a support for a ring binder spaced from one edge of the support and having equally spaced rings and a plurality of card decks, each card of each deck having punched holes for mounting on the ring binder and with indicia printed on the cards centered between the punched holes. The holes are spaced such that the number of complete holes is one less than the width of the card divided by the hole spacing. As indicia the cards can include letters, word prefixes, word roots and word suffixes, vowels or vowel sounds, consonants or consonant sounds, graphemes, phoneme mouth sequence pictures, raised pictures or Braille symbols. The corners of the cards may be cut. A support road is provided for insertion through a hole in the support under the ring binder. The support and cards can be constructed for contrasting color.

28 Claims, 10 Drawing Figures

FLIP CARD APPARATUS FOR FORMING UNITS OF SPEECH

1 Technical Field

This invention relates to a flip card apparatus designed primarily for use in developmental language education. It is specifically directed to forming word sounds or words or units of speech from phoneme mouth picture cards, grapheme soundletter cards or morpheme letter cards. This apparatus is part of a developmental language kit designed to help parents and teachers instruct students in language fundamentals.

2 Background Art

Language education has moved from the rather plain looking classroom having no more than reading books and spelling slate boards into the modern classroom overflowing with large posters, charts, and alphabet letters with animal associations. There are also student stations around the room with boxes of loose cards with stories for students who can set their own pace. Modern language programs have introduced audio records and tapes and some audio-visual films. Other programs make an attempt to be less expensive and also stress the importance of using student manipulatives to stimulate mental processing. Some of these programs supply the teacher with student kits having an astonishingly large number of loose pieces for student manipulation. Some are blocks; others are tiles; some are pieces of felt, and others are cut squares of paper with imprinted pictures or letters; and some are flashcards using pocket holders.

These kits are useful until parts disappear or until the various parts get mixed up and the teacher gives up in disgust after being overwhelmed by the task of inventory, redistribution and replacement of the pieces.

SUMMARY OF THE INVENTION

Broadly stated, the present invention, to be described in greater detail below, is directed to a flip card apparatus for forming units of speech having a ring binder mounted on a support structure and a plurality of card decks with each card on each deck punched for attachment to the ring binder and each card having indicia for cooperation with indicia of the cards of the other decks to form a unit of speech. With this construction the several decks are held in side-by-side relation whereby each card of each deck can be flipped over on the binder on the support for presenting a combination of the indicia of each card in each deck with each card in every other deck.

A feature and advantage of the present invention is that the cards in each deck can be manipulated freely to create units of speech without detaching, losing or mixing up the cards in the card decks and the storage space for the flip card apparatus is maintained at a minimum.

In accordance with another aspect of the present invention the support means for the flip card apparatus includes a support board to which the ring binder is fixedly secured and which is provided with an aperture therethrough located underneath the ring binder when attached thereto and having a support leg removably inserted into the aperture in the support board whereby the board and leg form a tripod to support the card decks at an acute angle to the surface on which the apparatus is positioned.

A feature and advantage of this aspect of the present invention is the ease in assembly and disassembly of the apparatus for utilization as well as compact storage of the entire assembly. Another feature of this aspect of the invention is the capability of an instructor grasping the support leg by holding the flip card apparatus in elevated position.

With the ring binder fixedly secured to the support board intermediate the top and bottom edges of the support board in accordance with another aspect of the invention, the cards in flipped-up position are supported by the board. With this feature of the invention the back side of each card can be used either in conjunction with the front side of the succeeding card or for temporary concealment of information relative to the front side of the same card.

In accordance with another aspect of the present invention the support board can be either transparent or the board and card deck constructed to produce contrast so that the Gestalt control method can be utilized with the different indicia of the different cards.

In accordance with still another aspect of the present invention, the flip card apparatus includes three card decks, one card deck provided with indicia forming the prefix to words, one card deck provided with indicia forming the roots for words and one card deck provided with indicia forming the suffix to words. With these three card decks different words can be formed by selecting a prefix card, a suffix card and a root card and then varying the word by selecting different cards from each of the card decks.

The indicia can be in the form of morpheme letter cards, phoneme mouth picture cards or grapheme soundletter cards.

In accordance with still another aspect of the present invention, the apparatus includes card decks provided with indicia forming the roots for words with the width of the card commensurate with the number of letters of the rootword. A feature and advantage of this aspect of the present invention is that the roots of different numbers of letters can be substituted for one another on the ring binder between the card decks for the prefixes and suffixes and the card decks adjusted to provide either the same spacing or no spacing between each of the card decks.

In accordance with still another aspect of the present invention, each card in each of the card decks is provided with indicia which form a sequence of the cards in each of the card decks. In this way the cards can always be maintained in proper sequence, and reference can be made to selection of cards from the card decks from their sequence number without giving away the interpretation and/or pronunciation of the indicia appearing on the card deck.

In accordance with still another aspect of the present invention having the last aforementioned feature the sequence indicia on the cards of the root card deck are centered on the card and the sequence indicia on the cards of the prefix and the cards of the suffix card decks are positioned close to opposite lateral margins of those card decks whereby the proper positioning of the respective card decks can always be maintained with reference to the position of the sequence indicia.

In accordance with still another aspect of the present invention the indicia on the cards form letters and the spacing from the beginning of one letter to the beginning of the next letter is substantially equal to the ring separation of the rings of the binder means. A feature and advantage of this aspect of the present invention is that the card decks can be provided immediately adjacent one another on the ring binder so that the letters make up complete words without extra spacing between letters. However the card decks can be separated by one ring of the ring binder to set off the decks in spaced apart relation for emphasis of the separate syllables or word portions signified by the letters on the separate decks.

In accordance with still another aspect of the last aforementioned aspect of the present invention, root card decks of different numbers of letters are provided. For example at least one root card deck for roots of three letters, at least one root card deck for roots of four letters and at least one root card deck for roots of five letters are provided and can be positioned in between the prefix and suffix card decks for forming the words as desired.

In accordance with another aspect of the present invention the number of punched holes in each card is one complete hole less than the width of the card divided by the hole spacing. This aspect of the invention permits edge trimming and/or corner trimming of the cards to avoid card interference without any reduction in the supporting material around the holes.

These features and advantages of the present invention will become more apparent upon a perusal of the following specification taken in conjunction with the accompanying drawings wherein similar characters of reference refer to similar parts in each of the several views.

BEST MODE FOR CARRYING OUT THE INVENTION

Figure 2:
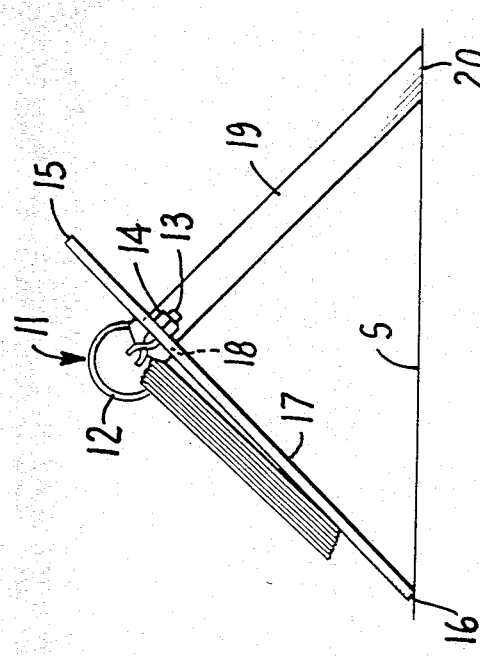
FIG. 2 is a side elevational view of the structure shown in FIG. 1 taken along line 2—2 in the direction of the arrows.

Referring now to the drawing, with particular reference to FIGS. 1-4, there is shown a flip card apparatus 10 in accordance with the present invention. The apparatus 10 has a ring binder 11 having a plurality of rings 12 and mounted such as via screws 13 and nuts 14 intermediate the top and bottom marginal edges 15 and 16, respectively, of a support board 17. An aperture 18 is provided centrally of the support board 17 underneath the ring binder 11 for removably receiving a support leg 19 such as of tubular plastic and having a beveled surface 20 at the free end thereof. With the axis of the aperture 18 normal to the plane of the board 17 the angle which the beveled surface 20 makes with the axis of the leg is complementary to the angle of inclination of the support board with a support surface S.

A plurality of card decks 21, 31 and 41 are provided, punched for attachment to the ring binder with each card of each deck having indicia for cooperation with indicia of the cards of the other decks to form a unit of speech. In the preferred embodiment illustrated in FIGS. 1-4 the indicia 22, 32 and 42, respectively, form letters of the alphabet with each card serving as a morpheme letter card. The first card deck 21 has letters forming the prefix to words; the second card deck 31 has letters forming the roots for words; and the third card deck 41 has letters forming the suffix to words. The cards have one complete punched hole less than the width of the card divided by the hole spacing.

Figure 3:
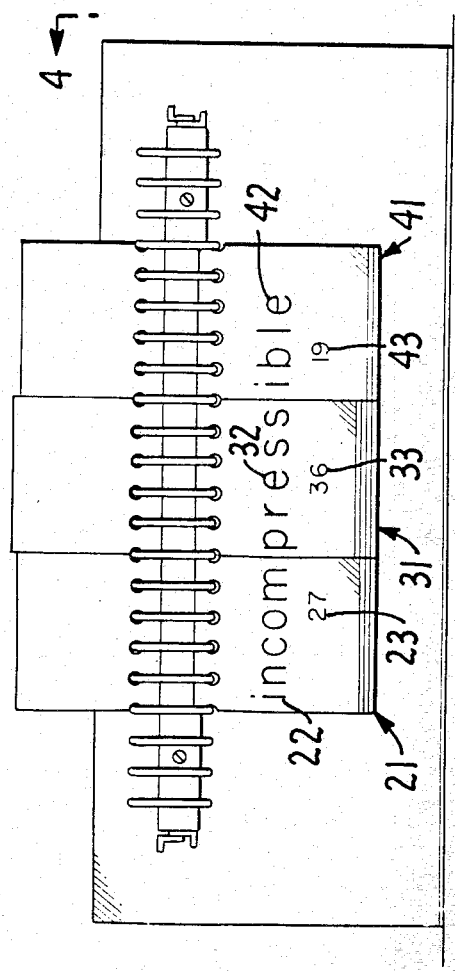
FIG. 3 is a front elevational view of the structure shown in FIG. 1 with cards of each of the several decks flipped over on the ring binder.
Figure 6:
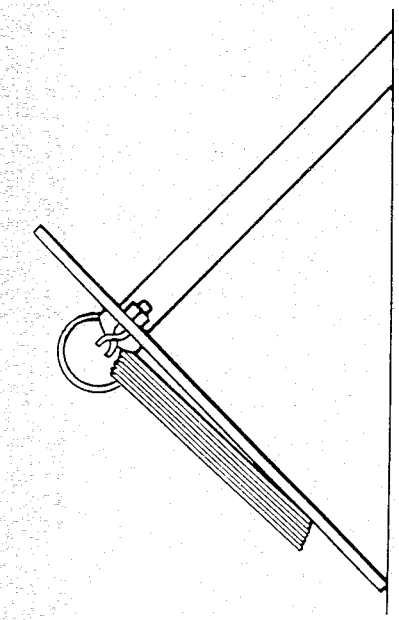
FIGS. 5-8 are views similar to FIGS. 1-4 illustrating an alternative embodiment of the present invention.

The spacing from the beginning of one letter to the beginning of the next letter is substantially equal to the ring spacing of the rings of the binder. For the preferred spacing of the letters on the cards and for forming words with the desired spacing between adjacent letters on adjacent cards, the ring punches in each card include a half punch along the edge of the card. As shown in FIG. 3 the cards of the root card deck 31 have root words containing five letters corresponding to the five punches including two half punches in the cards of that deck. The prefixes and suffixes typically contain from one to five letters. In the preferred embodiment of the invention as the apparatus is sold to the teacher or pupil there are additional root card decks respectively containing three and four letter roots and will have correspondingly three and four punches (each including two half punches) for attachment to the rings so that these three respective card decks are held on two or three rings of the ring binder 11.

Each of the card decks 21, 31 and 41 is provided with additional indicia, such as numerals shown as 23, 33 and 43, respectively, forming a sequence of the cards in each of the card decks. For example, in FIG. 3 the card in the prefix card deck 21 having indicia forming the prefix "incom" includes the indicia 23 forming the number "27" indicating that the particular card is the 27th card in the prefix card deck 21. Typically the sequence of cards are arranged alphabetically by the first letter. In order to make certain that the card decks 21, 31 and 41 do not get arranged improperly on the ring binder, the indicia 23, 33 and 43 are positioned in such a manner as to reflect where the card deck should be positioned with respect to the other card decks. The sequence indicia 33 on the second or root card deck are centered on each card. The sequence indicia 23 on the cards of the prefix card deck 21 are positioned toward the right-hand lateral margin of each card. The sequence indicia 43 of the cards in the suffix card deck 41 are positioned close to the left-hand margin of the cards of that deck.

It should be apparent from FIGS. 1-4 how words can be constructed from the prefix, root and suffix phoneme letter cards of the card decks 21, 31 and 41. The cards of each deck are flipped over on the ring binder 11 so that each card of each of the card decks 21, 31 and 41 can operate in conjunction with each of the cards of the other card decks. Thus, for a given root card of the root card deck 21, different prefixes from the prefix card deck can be used to change the word as well as different suffixes from the suffix card deck 41 with respect to each prefix and root combination.

Figure 4:
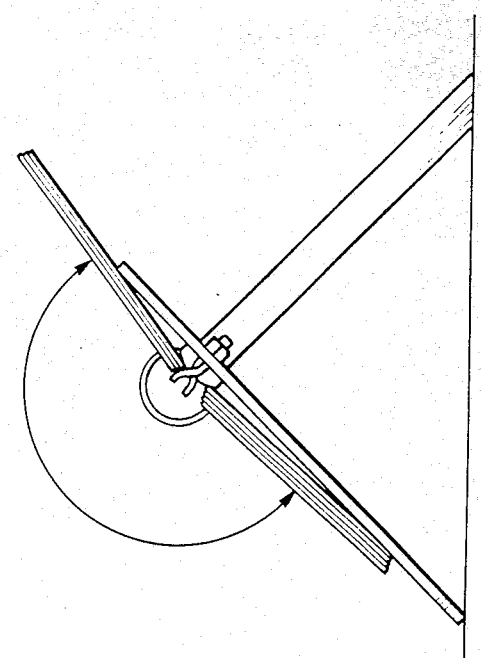
FIG. 4 is a side elevational view of the structure shown in FIG. 3 taken along line 4—4 in the direction of the arrows.
Figure 1:
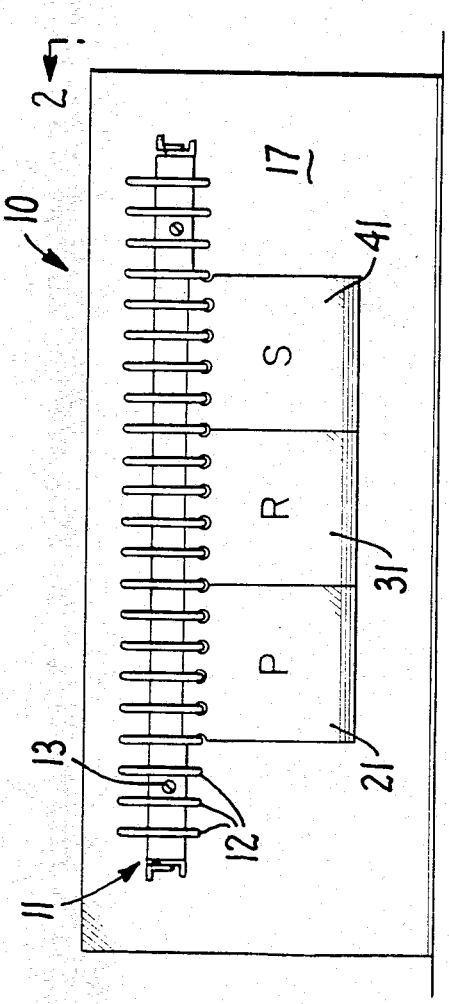
FIG. 1 is a front elevational view of a flip card apparatus in accordance with the present invention.

With the ring binder 11 positioned intermediate the marginal edges 15 and 16 of the support board, the cards from the card deck that are flipped upwardly and over on the rings 12 in the positions shown in FIG. 4 will show the back side of the card immediately preceding the card bearing the sequence indicia 23, 33 and 43 that appears in FIG. 3. The back side of these cards can be provided with indicia that either cooperates with the indicia on the front side of the card next in sequence or serve as hidden information relative to the letters that appear on the front side of that same card.

The flip card apparatus is typically operated on a support surface S in the positions illustrated in the drawing. However, with the support leg 19 formed such as of a rod or tubular member the apparatus can be grasped in the hand of the user for holding the flip card apparatus in elevated position. With the support leg 19 removable from the support board 17 the apparatus can be stored in minimal space, typically with the diameter of the support leg 19 selected so that it can lie within the rings 12 of the ring binder 11 when stored or shipped.

Figure 9:
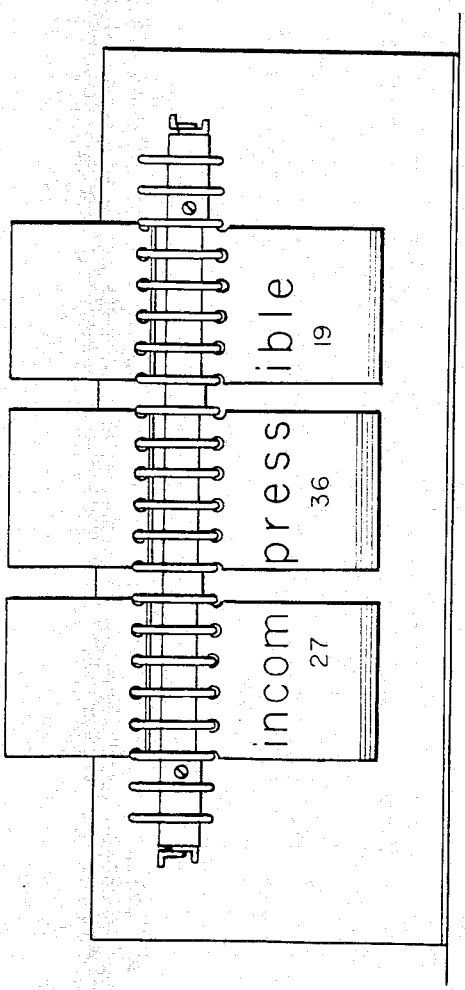
FIG. 9 is a view similar to FIG. 3 with the card decks positioned on the ring binder in spaced apart relation.

In accordance with one aspect of the present invention the support board 17 is made of a transparent material and in accordance with another aspect of the invention the support board and card decks are constructed to produce contrast either by way of having the support board transparent and the card decks non-transparent or by having the card decks and support board formed of contrasting colors or textures. With this contrasting feature of the cards and support board the card decks can be spaced apart with a ring space or letter space in between the card decks as shown in FIG. 9. The gestalt control method can use either a white paper over an opaque colored board or transmitted light intensity changes in a transparent board. During this operation of removing gestalt one produces visual changes in the cracks or spacings between the card decks. Word analysis is achieved by increasing the spacing between the card decks, and word synthesis is aided by decreasing the spacing between the card decks.

In accordance with another embodiment of the present invention illustrated in FIGS. 5-8 the corners of each of the cards in the decks adjacent the punched edge of the card are cut away as at 51 to reduce interference of the card with the binder rings as well as the cards of one deck with the cards of the adjacent deck.

Figure 5:
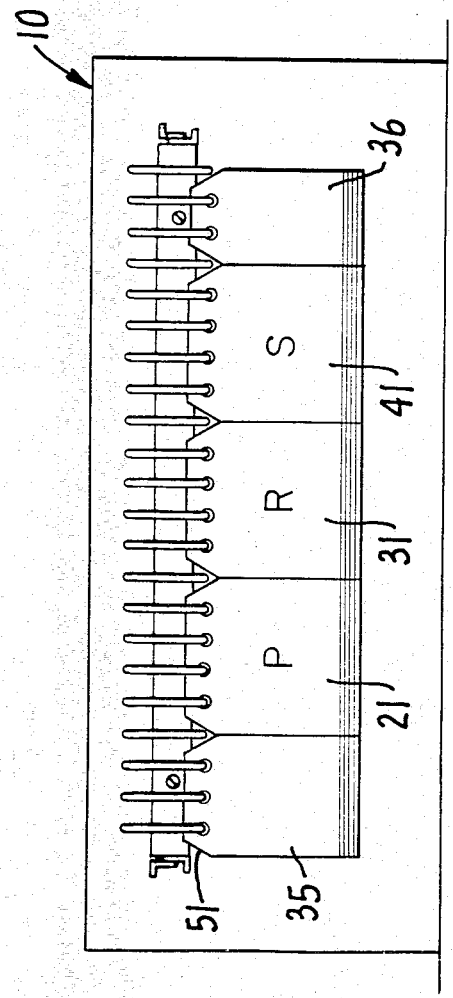
Figure 8:
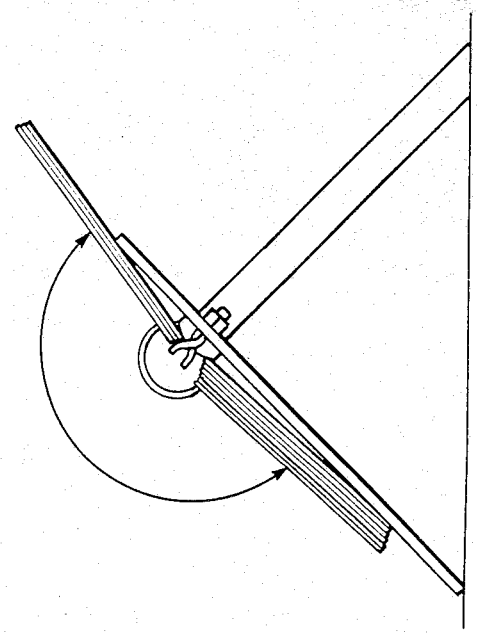
Figure 7:
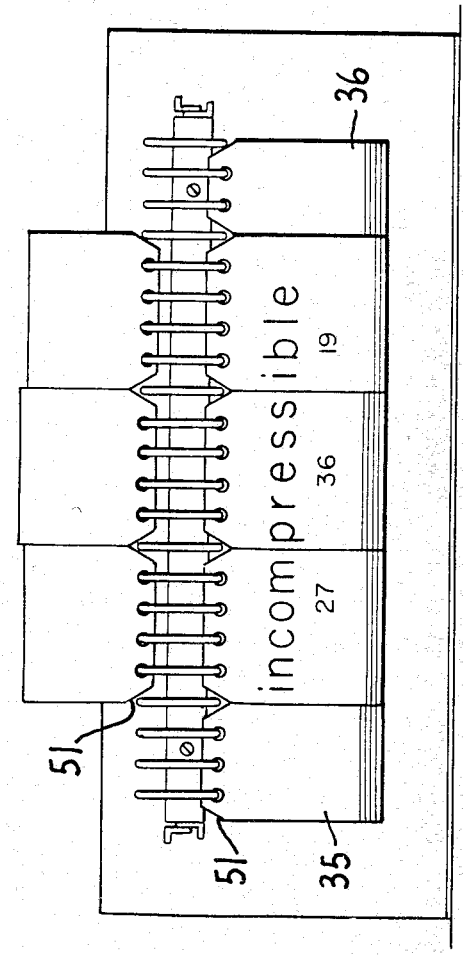

Also as shown in FIGS. 5 and 7 the root card decks of other root sizes such as the 3-complete hole four letter card deck 35 and the 2-complete hole three letter card deck 36 can be stored on the support board 17 when not in use. Additionally the indicia can form raised pictures or braille symbols.

It will be appreciated from the above that instead of the morpheme letter cards as shown, the indicia on the cards for forming a unit of speech can form phoneme mouth picture cards or grapheme soundletter cards.

Figure 10:
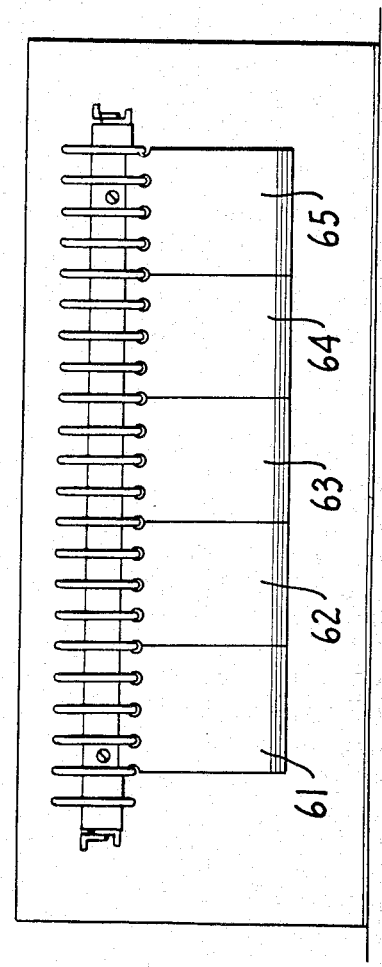
FIG. 10 is a view similar to FIG. 1 illustrating another embodiment of the present invention.

Additionally as shown in FIG. 10 the indicia on the card deck 61-65 can form just a single grapheme, either a vowel or a consonant so that words can be constructed by positioning either vowel or consonant card decks in the card deck position sequence 61-65 and the cards of the card decks flipped over to form words from the various potential combinations of vowels and consonants.

Numerous instructional exercises or games can be performed with the apparatus of this invention. Any number of people can play a game of forming a number of words by selecting various combinations. A time interval can be set for making lists of the number of words formable from a particular root or with a given prefix or suffix. Players in a game can challenge the word or words created by other players. The game can include the giving of definitions for the words formed. The apparatus can be used to teach pronunciation. The student can be instructed to create a word by being given the appropriate sequence number for a card in each of the card decks 21, 31 and 41. It is then his job to pronounce it and/or to give its definition. A particular set of instructions can emphasize accent patterns, spelling rule applications, grammatical usage, suffix connectors and stemming words. Numerous other uses of the aparatus will be readily apparent to persons skilled in the art. I claim:

1. A flip card apparatus for forming units of speech comprising in combination:
    a ring binder means having equally spaced rings;
    a plurality of card decks, each card of which is punched with a plurality of equally spaced holes inwardly of one card edge for attachment to said ring binder, each card of each deck having indicia for cooperation with indicia of the cards of the other card decks fo form a unit of speech, said holes in each of said cards spaced such that the number of complete holes is one less than the width of the card divided by the hole spacing, said indicia located on said cards substantially centered between a pair of said holes; and
    support means connected to said ring binder for holding the cards of said decks in side-by-side relation whereby the cards of each deck can be flipped over on said binder means on said support means for presenting a combination of the indicia of each card in each card deck with each card in every other deck.

2. The apparatus of claim 1 wherein said support means includes a support board,
    said ring binder means being fixedly secured to said support board,
    said support board having an aperture therethrough located in the region underneath the ring binder when attached thereto, and
    a support leg removably insertable into the aperture in said support board, said leg, when positioned in said aperture, serving to support said board on a support surface at an angle inclined with respect to the support surface.

3. The apparatus of claim 2 wherein said ring binder means is fixedly secured to the support board intermediate the top and bottom edges of said support board.

4. The apparatus of claim 3 wherein said support board is transparent.

5. The apparatus of claim 3 wherein said support board and said card decks are constructed to produce contrast.

6. The apparatus of claim 2 wherein
    said aperture contains an axis perpendicular to the surface of said support board and
    said support leg having a beveled surface at the free end thereof remote from the support board, said beveled surface making an angle with the axis of said support leg complementary to the angle of inclination of said support board with the support surface when said apparatus is positioned on said support surface.

7. The apparatus of claim 6 wherein said support leg is a round member adapted to be grasped in the hand of the user for holding the flip card apparatus in elevated position.

8. The apparatus of claim 1, including three card decks, one card deck provided with indicia forming the prefix to words, one card deck provided with indicia forming the roots for words, and one card deck provided with indicia forming the suffix to words.

9. The apparatus of claim 8 wherein said one card deck provided with indicia forming the roots for words has width commensurate with the number of letters in the word root.

10. The apparatus of claim 9 including at least three root card decks, one of said root card decks having indicia forming roots of three letters, one of said root card decks having indicia forming roots of four letters, and one of said root card decks having indicia forming roots of five letters.

11. The apparatus of claim 8 wherein the cards in each of said card decks are provided with indicia forming a sequence of the cards in each of said card decks.

12. The apparatus of claim 11 wherein the sequence indicia on the cards of said root card deck are centered on the card and the sequence indicia on the cards of said prefix and said suffix card decks are positioned close to opposite lateral margins of the cards.

13. The apparatus of claim 1 wherein said apparatus includes at least one card deck provided with indicia signifying a vowel or vowel sound and another card deck provided with indicia signifying a consonant or consonant sound.

14. The apparatus of claim 1 wherein said indicia form graphemes.

15. The apparatus of claim 1 wherein said indicia form phoneme mouth pictures.

16. The apparatus of claim 1 wherein said indicia form letters and the spacing from the beginning of one letter to the beginning of the next letter is substantially equal to the ring separation of the rings of said binder means.

17. The apparatus of claim 1 wherein said indicia form raised pictures.

18. The apparatus of claim 1 wherein said indicia form braille symbols.

19. The apparatus of claim 16 wherein the corners of the cards of each of said decks adjacent the punched edge of the card are cut away.

20. The apparatus of claim 16 including three card decks, one card deck provided with indicia forming the prefix to words, one card deck provided with indicia forming the roots for words and one card deck provided with indicia forming the suffixes to words.

21. The apparatus of claim 20 wherein said one card deck provided with indicia forming the roots for words has width commensurate with the number of letters in the word root.

22. The apparatus of claim 21 including at least three root card decks, one of said root card decks having indicia forming roots of three letters, one of said root card decks having indicia forming roots of four letters, and one of said root card decks having indicia forming roots of five letters.

23. The apparatus of claim 20 wherein the cards in each of said card decks are provided with indicia forming a sequence of the cards in each of said card decks.

24. The apparatus of claim 23 wherein the sequence indicia on the cards of said root card deck are centered on the card and the sequence indicia on the cards of said prefix and said suffix card decks are positioned close to opposite lateral margins of the cards.

25. A flip card apparatus for forming units of speech comprising in combination
  a ring binder means having equally spaced rings,
  a plurality of card decks, each card of which is punched for attachment to said ring binder, said punches in each of said cards spaced such that the number of complete punches is one less than the width of the card divided by the punch spacing, each card of each deck having indicia forming letters for cooperation with indicia forming letters on the cards of the other card decks to form a unit of speech, the spacing from the beginning of one letter to the beginning of the next letter being substantially equal to the ring separation of the rings of said binder means, said letters located on said cards substantially centered between a pair of punches,
  support means connected to said ring binder for holding the cards of said decks in side-by-side relation including
  a support board
  said ring binder means being fixedly secured to said support board intermediate the top and bottom edges of said support board,
  said support board having an aperture therethrough located in the region underneath the ring binder when attached thereto, and
  a support leg removably insertable into the aperture in said support board, said leg when positioned in said aperture serving to support said board on a support surface at an angle inclined with respect to the support surface.

26. The apparatus of claim 25, including three card decks, one card deck provided with indicia forming the prefix to words, one card deck provided with indicia forming the roots for words, and one card deck provided with indicia forming the suffix to words.

27. The apparatus of claim 26, including at least three root card decks, one of said root card decks having indicia forming roots of three letters, one of said root card decks having indicia forming roots of four letters, and one of said root card decks having indicia forming roots of five letters.

28. The apparatus of claim 26 wherein the cards in each of said card decks are provided with indicia forming a sequence of the cards in each of said card decks, said sequence forming indicia centered on the cards of said root card deck and positioned at opposite lateral margins of the cards of said prefix and said suffix card decks.

* * * * *